2 Sheets—Sheet 2

L. A. COOPER.
Corn-Planter, Marker and Cultivator.

No. 205,529. Patented July 2, 1878.

WITNESSES:
C. Neveux
C. Sedgwick

INVENTOR:
L. A. Cooper
BY Munn & Co
ATTORNEYS.

N. PETERS, PHOTO-LITHOGRAPHER, WASHINGTON, D. C.

UNITED STATES PATENT OFFICE.

LEONARD A. COOPER, OF WINTHROP, MISSOURI.

IMPROVEMENT IN CORN PLANTER, MARKER, AND CULTIVATOR.

Specification forming part of Letters Patent No. 205,529, dated July 2, 1878; application filed May 11, 1878.

*To all whom it may concern:*

Figure 1:
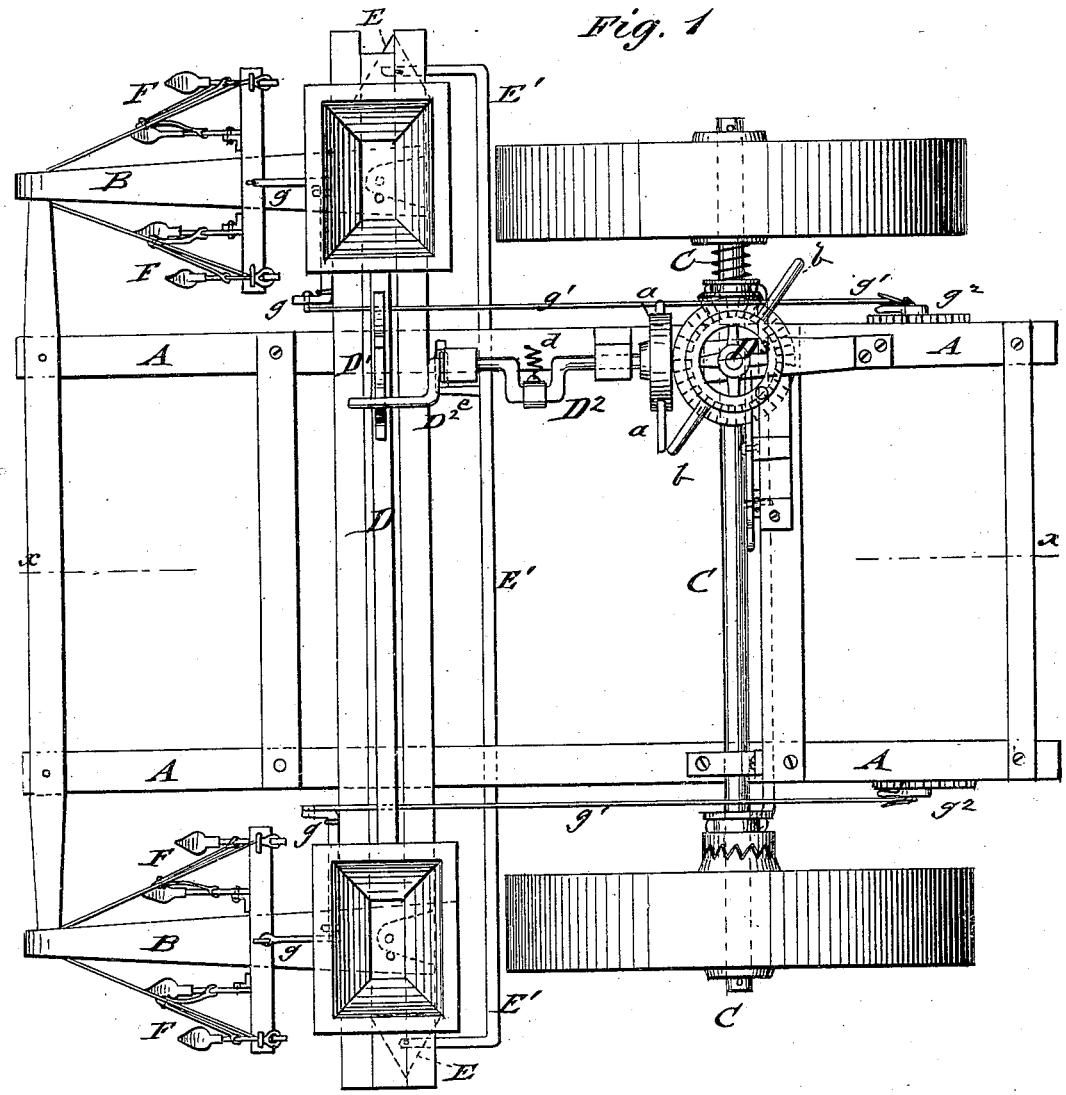
Figure 2:
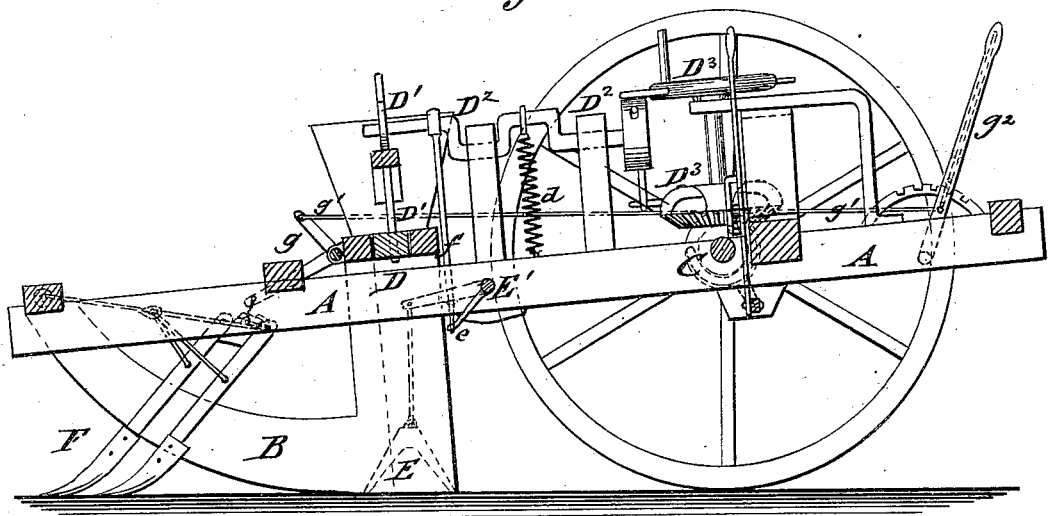
Figure 3:
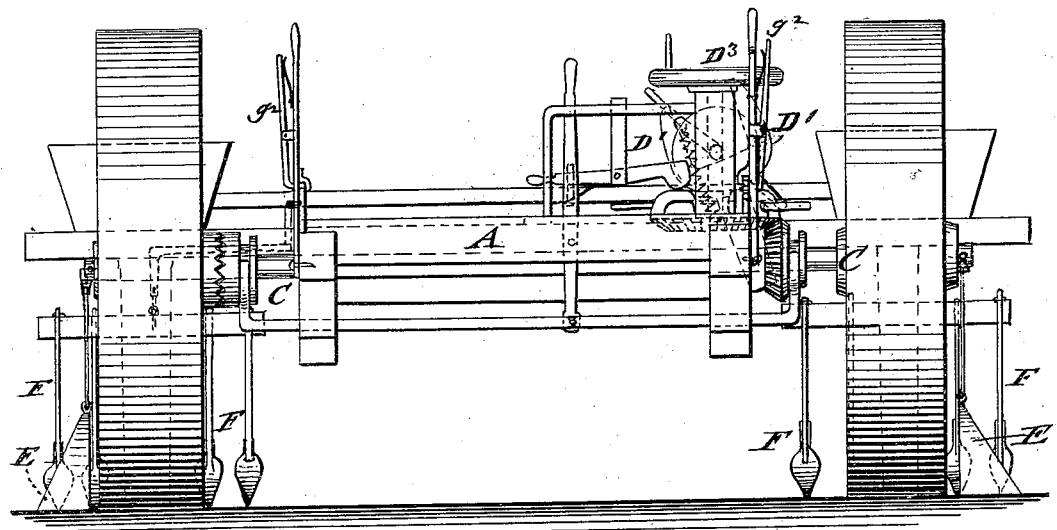

Be it known that I, LEONARD A. COOPER, of Winthrop, in the county of Buchanan and State of Missouri, have invented a new and Improved Corn Planter, Marker, and Cultivator, of which the following is a specification:

In the accompanying drawings, Figure 1 represents a plan view of my improved corn planter, marker, and cultivator; Fig. 2, a vertical longitudinal section on line $x$ $x$, Fig. 1; and Fig. 3, a rear elevation of the same.

Similar letters of reference indicate corresponding parts.

This invention relates to an improved corn planter, marker, and cultivator of simple and readily-operated construction, by which, in connection with the seed-dropping devices, the rows are marked and the ground cleared of weeds in reliable and superior manner; and the invention consists of an improved seed-dropping mechanism operated by the revolving axle in connection with a reciprocating crank-shaft.

Referring to the drawing, A represents the supporting-frame of my improved corn planter, marker, and cultivator, which frame is supported at the front part of the runners B, that cut out the furrows for the seed-dropping tubes, and hung at the rear part to the revolving axle C, that is provided with a fixed and a loose supporting-wheel. The seed-dropping mechanism is arranged in front of the wheels, with the usual hopper-shaped receptacles, conducting-tubes, and laterally-reciprocating slide-piece, that takes up the seed from the hoppers and transmits it to the conducting-tubes.

The slide-piece D of the seed-dropping mechanism is laterally reciprocated by means of an oscillating lever, $D^1$, that engages the slide-piece at its lower end, and is made fork-shaped at the upper end, and engaged by a horizontal crank-shaft, $D^2$, that oscillates in suitable bearings of frame A and by means of fixed diametrical arms $a$, that are engaged alternately by the diametrical arms $b$ of revolving wheels $D^3$. The arms of the upper wheel $D^3$ are placed at right angles to those of the lower wheel, so as to alternately engage the arms of the crank-shaft and throw thereby the forked lever and slide-piece from one side to the other. This motion is assisted by a spring, $d$, attached to frame A, and a center crank of the crank-shaft, the spring swinging the crank-shaft over to one side or the other whenever the center crank has passed beyond its vertical position.

The vertical shaft of the revolving wheels $D^3$ turns in suitable bearings of the frame A, and is revolved by a bevel-gear connection with the supporting-axle of the planter. The seed-dropping mechanism is thrown in and out of gear by means of the customary clutch mechanism on the axle and by an operating hand-lever, so that the dropping of the seed may be interrupted when turning on the feed, or when going to and from the place of work.

In connection with the seed-dropping mechanism are worked the row-markers E, which are suspended by connecting-rods from the arms of the lateral crank-shaft $E'$, that is connected, by a fixed crank-arm, $e$, and connecting-rod $f$, with the actuating crank-shaft $D^2$ of the seed-dropping mechanism. The markers are thereby simultaneously but alternately raised and lowered with each dropping of the seed at either side of the planter, so as to indicate on the ground the exact position of the same.

The markers are made of triangular shape and hollow, with sharp bottom edges, and of sufficient weight to make clear and distinct impressions on the ground.

To the furrow-cutting runners of the planter are hung a series of cultivating-plows, F, by means of a cross plow-beam and suitable stiffening-braces, which plows are jointly raised or lowered by double crank-lever $g$, connecting-rod $g^1$, and adjustable hand-lever $g^2$, that may be readily reached from the driver's seat.

The cultivating-plows cut up the weeds and prepare the ground sufficiently for receiving the seeds. They are specially useful when some time has elapsed between the breaking of the ground and the planting of the seed.

The simple construction of the seed-dropping devices, in connection with the markers worked thereby and with the cultivating-plows, forms a reliable planter, marker, and cultivator, that is of compact shape and easily operated by the driver, as every hand-lever is reached with great facility.

Having thus described my invention, I claim as new and desire to secure by Letters Patent—

In a corn planter or cultivator, the combination of the laterally-reciprocating slide-piece of the seed-dropper with an oscillating forked lever, reciprocating and spring-acted crank-shaft, and revolving wheels operated from the supporting-axle, and engaging by diametrical arms, alternately, the diametrical arms of the crank-shaft, substantially as and for the purpose set forth.

LEONARD ARNOLD COOPER.

Witnesses:
   V<span>ME</span> HOVEY,
   A. H. GOEKMAN.